(12) United States Patent
Park et al.

(10) Patent No.: US 8,729,489 B2
(45) Date of Patent: May 20, 2014

(54) RADIATION DETECTING DEVICE TO MEASURE GAMMA-RAY AND NEUTRON DISCRIMINATELY

(75) Inventors: Se-Hwan Park, Daejeon (KR); Sung-Ho Eom, Daejeon (KR); Hee-Sung Shin, Daejeon (KR); Han Soo Kim, Daejeon (KR); Ho-Dong Kim, Daejeon (KR)

(73) Assignees: Korea Atomic Energy Research Institute, Daejeon (KP); Korea Hydro and Nuclear Power Co., Ltd., Seoul (KR)

( * ) Notice: Subject to any disclaimer, the term of this patent is extended or adjusted under 35 U.S.C. 154(b) by 372 days.

(21) Appl. No.: 13/190,095

(22) Filed: Jul. 25, 2011

(65) Prior Publication Data
US 2012/0043469 A1     Feb. 23, 2012

(30) Foreign Application Priority Data
Aug. 23, 2010  (KR) .................. 10-2010-0081626

(51) Int. Cl.
*G01T 1/00*  (2006.01)
*H01J 47/00*  (2006.01)
*G01T 3/08*  (2006.01)

(52) U.S. Cl.
USPC .............. 250/394; 250/374; 250/370.05

(58) Field of Classification Search
USPC ................... 250/394, 370.05, 374
See application file for complete search history.

(56) References Cited

U.S. PATENT DOCUMENTS

| | | | | |
|---|---|---|---|---|
| 2,469,463 | A | * | 5/1949 | Russell .................. 376/160 |
| 4,300,050 | A | * | 11/1981 | Hizo et al. ............... 250/374 |
| 4,682,036 | A | * | 7/1987 | Wakayama et al. ........ 250/374 |
| 4,765,943 | A | * | 8/1988 | DeLorenzo et al. ....... 376/156 |
| 6,614,180 | B1 | | 9/2003 | Francke et al. |
| 7,078,705 | B1 | * | 7/2006 | Ianakiev et al. ....... 250/390.01 |
| 7,745,800 | B1 | * | 6/2010 | McGinnis ............. 250/390.01 |
| 2002/0175291 | A1 | * | 11/2002 | Reeder et al. ............ 250/369 |
| 2005/0121618 | A1 | * | 6/2005 | Fowler et al. ............ 250/394 |

FOREIGN PATENT DOCUMENTS

| | | |
|---|---|---|
| JP | 1996-285949 A | 11/1996 |
| WO | 2004109331 A2 | 12/2004 |
| WO | 2010038877 A1 | 4/2010 |

* cited by examiner

*Primary Examiner* — David Porta
*Assistant Examiner* — Mindy Vu
(74) *Attorney, Agent, or Firm* — Fredrikson & Byron, PA

(57) ABSTRACT

A radiation detecting device is provided, according to which it is possible use only one radiation detecting device to measure radiation and measure gamma ray and neutron at once and discriminately in a restricted space. The radiation detecting device includes a radiation detecting unit to measure gamma ray and neutron discriminately at once, and a signal processing circuit which applies voltage to the neutron detecting unit and indicates measured gamma ray and neutron discriminately.

11 Claims, 1 Drawing Sheet

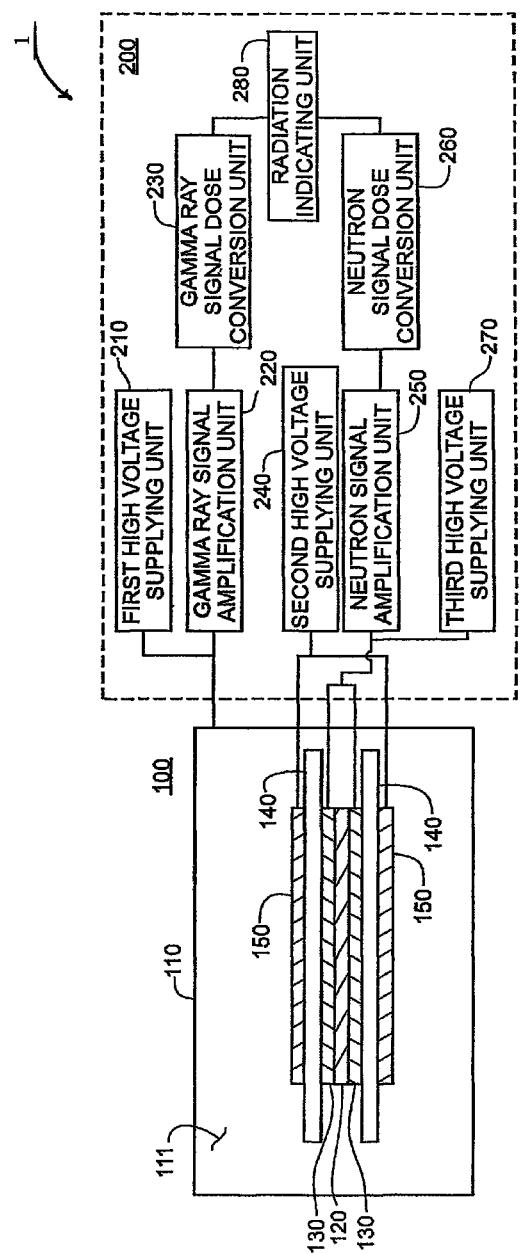

RADIATION DETECTING DEVICE TO MEASURE GAMMA-RAY AND NEUTRON DISCRIMINATELY

CROSS REFERENCE TO RELATED APPLICATIONS

This application claims priority from Korean Patent Application No. 10-2010-0081626, filed on Aug. 23, 2010, in the Korean Intellectual Property Office, the disclosure of which is incorporated herein by reference in its entirety.

BACKGROUND OF THE INVENTION

When using nuclear energy and radiation, it is frequently required to measure gamma ray and neutron discriminately. For example, gamma ray and neutron generated from nuclear spent fuel are measured to determine the amount of the nuclear materials included in the spent fuel.

A detecting device for measuring gamma ray or neutron could be inserted in a guide tube of nuclear fuel assembly to measure the radiation. However, with a general conventional detecting device, a detecting device for gamma ray and a detecting device for neutron have to be inserted respectively to measure the gamma ray and neutron since the radius of the guide tube is limited.

In other words, with the general conventional radiation detecting device, gamma ray and neutron cannot be detected at once.

SUMMARY OF THE INVENTION

The present inventive technical concept solves the above problems, and aims to provide a radiation detecting device to measure the gamma ray and neutron at once in a restricted space.

To achieve the above purpose, the radiation detecting device of one embodiment includes a radiation detecting unit which measures and discriminates gamma ray and neutron simultaneously and a signal processing circuit which applies high voltage to the radiation detecting unit, amplifies the signals from the radiation detection unit, and indicates the neutron and gamma-ray dose separately.

The radiation detecting unit includes an outer chamber which is filled with gas and detects gamma ray entering the outer chamber, a neutron reactive thin layer which is reactive to neutron and bonded to a pair of a first neutron detecting electrodes, a pair of the first neutron detecting electrodes, a pair of a semiconductor detecting unit which is bonded to the first neutron detecting electrode to measure the secondary radiations from the neutron reactive layer, and a pair of second neutron detecting electrodes which is bonded to the semiconductor detecting unit to supply high voltage to the semiconductor detecting unit.

The signal processing circuit includes a first high voltage supplying unit which is electrically connected to the outer chamber to supply voltage to the outer chamber, a gamma ray signal amplification unit to amplify the detected gamma ray signal, a gamma ray signal dose conversion unit which converts gamma ray signal amplified at the gamma ray signal amplification unit into radiation dose, a second high voltage supplying unit which is electrically connected to the second neutron detecting electrode to supply voltage thereto, a neutron signal amplification unit which is electrically connected to the first neutron detecting electrode to amplify neutron signal detected, a third high voltage supplying unit which is electrically connected to the first neutron detecting electrode to supply high voltage to the first neutron detecting electrode, and a radiation indicating unit which indicates gamma ray dose and neutron dose.

The outer chamber is filled with gas and is supplied with high voltage through the first high voltage supplying unit. If gamma ray is entered into the outer chamber, charge signal is generated, collected and delivered to the gamma ray signal amplification unit.

Filling gas may be inert gas or mixed gas.

The neutron reactive thin layer is at least one of Li-6, B-10, Gd or a compound of Li-6, B-10 or Gd.

The first neutron detecting electrode is electrically connected to the third high voltage supplying unit to supply high voltage to the semiconductor detecting unit and collects charge signal generated from the neutron reactive thin layer and sends the charge signal to the neutron signal amplification unit.

The semiconductor detecting unit is in a diode structure, measures electron-positron signal converted from radiation and uses indirect way of neutron measurement in which the neutron reactive thin layer reacts with neutron to generate charge carriers, and the charge carriers enter into the semiconductor detecting unit.

The second neutron detecting electrode is bonded to the semiconductor detecting unit to supply high voltage to the semiconductor detecting unit and collects electron-positron signal converted by radiation supplied to the semiconductor detecting unit.

The second high voltage applying unit is electrically connected to the second neutron detecting electrode, and may apply high voltage to the second neutron detecting electrode to measure a gamma ray and neutron.

The third high voltage applying unit is electrically connected to the first neutron detecting unit and may apply high voltage to the first neutron detecting electrode to measure neutron.

As explained above, in the embodiments, it is possible to use only one radiation detecting device to measure radiation and measure gamma ray and neutron discriminately at once and discriminately in a restricted space.

BRIEF DESCRIPTION OF THE DRAWINGS

FIG. 1 illustrates a radiation detecting device which measures gamma ray and neutron at once and discriminately according to an embodiment.

DETAILED DESCRIPTION OF EXEMPLARY EMBODIMENTS

Exemplary embodiments will be explained in greater detail below with reference to the accompanying drawing. In the drawing, the same or like components or devices are represented as the same reference numerals or symbols. Further, detailed explanations of the known functions or components will be skipped to avoid ambiguity of the embodiments.

In one embodiment, a radiation detecting device is applicable to radiation fields to measure gamma ray and neutron discriminately in a restricted space, and may include a gas-type detecting device which measures gamma ray and a small semiconductor detecting device placed inside of the gas-type detecting device to measure neutron, in which the semiconductor detecting electrode and gamma ray detecting electrode have a voltage gap there between to measure gamma ray, while the semiconductor detecting device measures neuron concurrently, so that it is possible to measure gamma ray and neutron discriminately in a restricted space.

FIG. 1 illustrates a radiation detecting device to measure gamma ray and neutron discriminately according to an embodiment.

Referring to FIG. 1, a radiation detecting device 1 includes a radiation detecting unit 100 which simultaneously measures gamma ray and neutron discriminately, and a signal processing circuit 200 which supplies high voltage to the radiation detecting unit 100 and indicates the measured gamma ray and neutron discriminately.

The radiation detecting unit 100 includes an outer chamber 110, a neutron reactive thin layer 120, a first neutron detecting electrode 130, a semiconductor detecting unit 140 and a second neutron detecting electrode 150.

The outer chamber 110 is filled with gas and detects gamma ray entering the radiation detecting unit 100. The inside 111 of the outer chamber 110 may be filled with gas to measure gamma ray. Filling gas may be inert gas or mixed gas which has high reactivity with gamma ray and stability in operating, such as Ar, N or Xe, but not limited thereto.

The outer chamber 110 may collect ion-electron generated from the inside 111 of the outer chamber when high voltage is supplied.

The inside 111 of the outer chamber 110 is filled with gas and high voltage is supplied through a first high voltage supplying unit 210. When gamma ray enters the outer chamber 110, an electric charge signal is generated, and the generated charge signal is collected and sent to gamma ray signal amplification unit 220.

The neutron reactive thin layer 120 is reactive to neutron and bonded to a pair of a first neutron detecting electrons 130, as illustrated in FIG. 1, and placed inside of the outer chamber 110.

The neutron reactive thin layer 120 includes materials with large neutron reaction cross section, and may be at least one of Li-6, B-10, Gd or a compound of Li-6, B-10 or Gd.

Also, the neutron reactive thin layer 120 reacts with neutron to generate charge signal such as alpha ray, beta ray or ion, and is desirably designed to maximize the neutron response.

A pair of the first neutron detecting electrodes 130 may be bonded to an upper and a lower surface of the neutron detection reactive thin layer 120 respectively.

To be specific, the first neutron detecting electrodes 130 may be electrically connected to a third high voltage supplying unit 270.

The first neutron detecting electrode 130 is a metal electrode bonded to the semiconductor detecting unit 140, and is constructed to supply high voltage to the semiconductor detecting unit 140 and collect electron-positron or electron-positron signal converted from radiation through the semiconductor detecting unit 140.

Also, the first neutron detecting electrode 130 is desirably designed to minimize the energy loss of charge carriers, which are generated in the neutron reactive thin layer 120.

As illustrated in FIG. 1, a pair of the semiconductor detecting units 140 may be bonded to the first neutron detecting electrode 130 respectively to measure incident radiation.

The semiconductor detecting unit 140 is formed from semiconductor such as Si, GaAs, or SiC and the radiation entered into the semiconductor detecting unit 140 is converted to electron-positron so that the radiation is measured.

The semiconductor detecting unit 140 is in a diode structure to measure radiation, and may have a variety of structures such as Schottky diode, P-N diode, PIN diode to minimize the electric leakage current.

In measuring neutron, the semiconductor detecting unit 140 uses indirect way of neutron measurement in which the neutron reactive thin layer 120 reacts with neutron to generate charged carriers, and the charged carriers enter into the semiconductor detecting unit 140.

As illustrated in FIG. 1, the second neutron detecting electrode 150 may include a pair of metal thin layers bonded to the semiconductor detecting unit 140, respectively.

To be specific, the pair of second neutron detecting electrodes 150 may be bonded to the semiconductor detecting unit 140 to supply voltage to the semiconductor detecting unit 140.

The signal processing circuit 200 includes a first high voltage supplying unit 210, a gamma ray signal amplification unit 220, a gamma ray signal dose conversion unit 230, a second high voltage supplying unit 240, a neutron signal amplification unit 250, a neutron signal dose conversion unit 260, a third high voltage supplying unit 270 and a radiation indicating unit 280.

The first high voltage supplying unit 210 is electrically connected to the outer chamber 110 to supply voltage to the outer chamber 110.

The gamma ray signal amplification unit 220 operates to amplify the detected gamma ray signal. The outer chamber 110 is filled with gas and high voltage is supplied thereto through the first high voltage supplying unit 210, and when gamma ray is entered into the inside 111 of the outer chamber 110, collected charge signal is transmitted so that gamma ray signal is amplified.

The gamma ray signal dose conversion unit 230 converts gamma ray signal amplified at the gamma ray signal amplification unit 220 into radiation dose.

The second high voltage supplying unit 240 is electrically connected to the second neutron detecting electrode 150 to supply voltage thereto. To be specific, the second high voltage supplying unit 240 supplies high voltage to the second neutron detecting electrode 150.

The neutron signal amplification unit 250 is electrically connected to the first neutron detecting electrode 130 to amplify neutron signal detected from the neutron reactive thin layer 120.

The neutron signal dose conversion unit 260 converts neutron signal amplified at the neutron signal amplification unit 250 into radiation dose.

The third high voltage supplying unit 270 is electrically connected to the first neutron detecting electrode 130, and supplies high voltage to the first neutron detecting electrode 130 to measure neutron.

The radiation indicating unit 280 is connected to the gamma ray signal dose conversion unit 230 and the neutron signal dose conversion unit 260 to indicate gamma ray dose and neutron dose detected at the radiation detecting unit 100 discriminately.

The radiation indicating unit 280 may be any device which can display gamma ray dose and neutron dose, and the kinds of display devices are not construed as limiting the invention.

The above explains a radiation detecting device of one embodiment with reference of the accompanying drawing, but one will recognize that the invention is not limited by the disclosure or the drawing. Therefore, the present invention can be modified by those skilled in the art within technical scope of the invention.

What is claimed is:

1. A radiation detecting device comprising:
   a radiation detecting unit for measuring and discriminating a gamma ray and a neutron simultaneously;

a signal processing circuit for applying voltage to the radiation detecting unit and marking the measured gamma ray and neutron discriminately, wherein the radiation detecting unit comprises:
an outer chamber which is filled with gas and which detects the gamma ray entering the radiation detecting unit;
a neutron reactive thin layer which is reactive to the neutron and placed inside of the outer chamber;
a first neutron detecting electrode which is bonded to upper and lower surfaces of the neutron reactive thin layer respectively;
a semiconductor detecting unit which is bonded to the first neutron detecting electrode and which measures an incident radiation; and
a second neutron detecting electrode which is bonded to the semiconductor detecting unit and which makes an electric field in the semiconductor detecting unit and inside the outer chamber.

2. The radiation detecting device of claim 1, wherein the signal processing circuit comprises:
a first high voltage supplying unit which is electrically connected to the outer chamber to supply voltage to the outer chamber;
a gamma ray signal amplification unit which amplifies a detected gamma ray signal;
a gamma ray signal dose conversion unit which converts the gamma ray signal amplified at the gamma ray signal amplification unit into a gamma ray dose;
a neutron signal amplification unit which is electrically connected to the first neutron detecting electrode to amplify a neutron signal detected from the neutron reactive thin layer;
a neutron signal dose conversion unit which converts the neutron signal amplified at the neutron signal amplification unit into a neutron dose;
a second high voltage supplying unit which is electrically connected to the first neutron detecting electrode and which supplies high voltage to the first neutron detecting electrode to measure the neutron; and
a radiation indicating unit which is connected to the gamma ray signal dose conversion unit and the neutron signal dose conversion unit to indicate the gamma ray dose and the neutron dose detected at the radiation detecting unit discriminately.

3. The radiation detecting device of claim 2, wherein the inside of the outer chamber is filled with gas and high voltage is supplied through the first high voltage supplying unit, and when the gamma ray enters the outer chamber, an electric charge signal is generated, and the generated charge signal is collected and sent to the gamma ray signal amplification unit.

4. The radiation detecting device of claim 2, wherein the filling gas of the inside of the outer chamber is inert gas or mixed gas.

5. The radiation detecting device of claim 2, wherein the neutron reactive thin layer is at least one of Li-6, B-10, Gd, or a compound of Li-6, B-10 or Gd, and reacts with the neutron to generate the charge signal.

6. The radiation detecting device of claim 5, wherein the charge signal is at least one of alpha ray, beta ray or ion.

7. The radiation detecting device of claim 2, wherein the first neutron detecting electrode is electrically connected to a third high voltage supplying unit to supply voltage to the semiconductor detecting unit, and the first neutron detecting electrode collects and sends the charge signal generated from the semiconductor detecting unit to the neutron signal amplification unit.

8. The radiation detecting device of claim 2, wherein the semiconductor detecting unit (i) is in a diode structure, (ii) measures an electron-positron signal converted by radiation and (iii) uses an indirect way of neutron measurement in which the neutron reactive thin layer reacts with the neutron to generate a charged ion, and the charged ion is entered into the semiconductor detecting unit.

9. The radiation detecting device of claim 2, wherein the second neutron detecting electrode is bonded to the semiconductor detecting unit to supply voltage to the semiconductor detecting unit, and collects an electron-positron signal converted by radiation through the semiconductor detecting unit.

10. The radiation detecting device of claim 2, wherein the second high voltage supplying unit is electrically connected to the second neutron detecting electrode, and supplies high voltage to the second neutron detecting electrode.

11. The radiation detecting device of claim 2, wherein the second high voltage supplying unit is electrically connected to the first neutron detecting electrode and supplies high voltage to the first neutron detecting electrode.

\* \* \* \* \*